US009501939B2

(12) United States Patent
Nelson

(10) Patent No.: US 9,501,939 B2
(45) Date of Patent: Nov. 22, 2016

(54) MULTISENSORY LITERACY INSTRUCTION SYSTEM

(71) Applicant: Sonya Janine Nelson, Mentone, CA (US)

(72) Inventor: Sonya Janine Nelson, Mentone, CA (US)

( * ) Notice: Subject to any disclaimer, the term of this patent is extended or adjusted under 35 U.S.C. 154(b) by 0 days.

(21) Appl. No.: 15/148,304

(22) Filed: May 6, 2016

(65) Prior Publication Data

US 2016/0253909 A1 Sep. 1, 2016

Related U.S. Application Data

(63) Continuation-in-part of application No. 14/058,265, filed on Oct. 20, 2013.

(51) Int. Cl.
*G09B 1/08* (2006.01)
*G09B 19/00* (2006.01)
*G09B 11/04* (2006.01)

(52) U.S. Cl.
CPC ............... *G09B 1/08* (2013.01); *G09B 11/04* (2013.01); *G09B 19/00* (2013.01)

(58) Field of Classification Search
CPC ............................... G09B 1/08; G09B 11/04
USPC ........................................................ 434/167
See application file for complete search history.

(56) References Cited

U.S. PATENT DOCUMENTS 1,187,881 A * 6/1916 Armstrong ............... B41K 1/02
101/368

5,000,688 A * 3/1991 Clamp .................. G09B 11/04
101/127
5,511,980 A * 4/1996 Wood ..................... G09B 1/04
434/157
2004/0077497 A1* 4/2004 Korane ..................... B43L 1/08
503/201

OTHER PUBLICATIONS

"Write and Wipe Letters Lowercase," Lily's Playhouse, http://web.archive.org/web/20120703073639/http://www.lilysplayhouse.com.au/educational/literacy/write-and-wipe-letters-lowercase, Jul. 3, 2012.*
"School Fonts," SchoolFonts.com, http://web.archive.org/web/20020204001957/http://www.schoolfonts.com/, Feb. 4, 2002.*

* cited by examiner

*Primary Examiner* — Robert J Utama
*Assistant Examiner* — Jennifer L Korb
(74) *Attorney, Agent, or Firm* — Kintner IP, LLC; Mary Frances Ludwig

(57) ABSTRACT

A literacy instruction system includes a plurality of pieces each having a groove in the top face in the shape of a character, such as a letter, numeral, or geometric shape. A flexible, erasable writing surface is permanently adhered to the top face and covers the groove. The writing surface is configured to receive the tip of a writing instrument and resiliently depress into the groove below, whereby a raised outline in the top face guides the tip to aid in writing the character for which the groove is shaped. In an embodiment, the bottom face of each piece is covered in a magnetic material, and the system is packaged with a magnetic board for holding the character pieces. In another embodiment, the plastic writing surface is transparent. These embodiments enable the character pieces to be manipulated quickly and easily, accelerating the process of learning to write and spell.

11 Claims, 5 Drawing Sheets

MULTISENSORY LITERACY INSTRUCTION SYSTEM

CROSS REFERENCE TO RELATED APPLICATION

This application is a Continuation-In-Part of and claims the filing benefit under 35 U.S.C. §120 of application Ser. No. 14/058,265, filed 20 Oct. 2013, which is hereby incorporated by reference.

TECHNICAL FIELD

The present invention pertains generally to literacy instruction, and more particularly to a literacy instruction system including a plurality of multisensory character shaped pieces.

BACKGROUND OF THE INVENTION

The traditional stencil is one prior art writing training device in which the proper manner of writing is mastered by tracing a guide with a writing instrument. A stencil is a thin sheet of material, such as paper, plastic, or metal, with letters or a design cut from it, used to produce the letters or design on an underlying surface by applying pigment through the cut-out holes in the material.

A first drawback of a stencil is that to be formed from a continuous piece of material, stencils of letters and numerals which encircle a hole, such as a, b, p, d, 8, 9, and 0, must have a small break where the hole portion is connected to the rest of the outline. These characters therefore cannot be written with one continuous stroke. At the break in the stencil the writing instrument stops and the student must lift the writing instrument and place it on the other side of the break, disrupting the flow of the writing process. Having to lift the pencil off the paper is detrimental to learning to write characters properly, and may exacerbate the problems that those with reading and writing difficulties are trying to overcome.

The second drawback is that during the process of learning to write and spell, the child must find the appropriate letter stencil, line it up with the last letter, trace it, and then find next letter, etc., repeating this process for each letter in the word being written. This is a cumbersome, time-consuming process which disrupts the flow of learning to write and spell. In addition, the stencil of a given letter covers letters of the same word which were previously written, preventing the student from being able to visualize the word as they write.

The third drawback is that stencils are often used with an underlying surface, such as paper, which is used once and then thrown away. This approach is an unnecessary waste of money and natural resources.

Finally, the fourth drawback is that the stencil must be held in place with the other hand while the student uses it. This process is also cumbersome, and if the stencil is not held firmly, it slips, and the image is not formed correctly. Therefore, the student will soon get bored or frustrated, and sufficient training will not be obtained.

BRIEF SUMMARY OF THE INVENTION

The multisensory literacy instruction system includes magnetic pieces in the shape of letters, numerals, special characters, and geometric shapes. The pieces are packaged as a set, and can be used as a complete system for teaching reading, writing, and spelling. The system is especially useful for children under the age of seven and people who have dyslexia or other learning disabilities. These magnetic pieces are used to teach a student how to properly write characters as they simultaneously learn to read and spell. The outer shape of the individual pieces being in the shape of the character also provides sensory reinforcement for tactile and kinesthetic learners.

The system enables a child to learn to write quickly by providing a grooved outline which is covered by a smooth, flexible writing surface making it possible to receive the tip of a writing instrument in the groove without the tip penetrating the writing surface. The student traces the character using the groove as a guide, with a dry erase marker or erasable crayon, and then just wipes it off, giving the child the benefit of repeated practice.

In accordance with an embodiment of the literacy instruction system, a plurality of pieces each have a raised outline, a groove in the shape of a character, and a flexible, erasable writing surface permanently adhered to the raised outline and covering the groove. The writing surface is configured to receive the tip of a cooperating writing instrument and resiliently depress into the groove, whereby the raised outline guides the tip to aid in writing the character for which the groove is shaped.

In accordance with another embodiment, each raised outline is adjacent to an external edge.

In accordance with another embodiment, the writing surface is transparent.

In accordance with another embodiment, the bottom face of each piece is covered in a magnetic material.

In accordance with another embodiment, the system includes at least one piece having the shape of each letter of the alphabet. In accordance with another embodiment, the system includes pieces having the shape of each numeral. In accordance with another embodiment, the system includes pieces having geometric shapes.

In accordance with another embodiment, pieces having the shape of letters are in a cursive style. In accordance with another embodiment, pieces having the shape of letters are in a D'Nealian style.

Other embodiments, in addition to the embodiments enumerated above, will become apparent from the following detailed description, taken in conjunction with the accompanying drawings, which illustrate, by way of example, the principles of the literacy instruction system and method of use.

Figure 1:
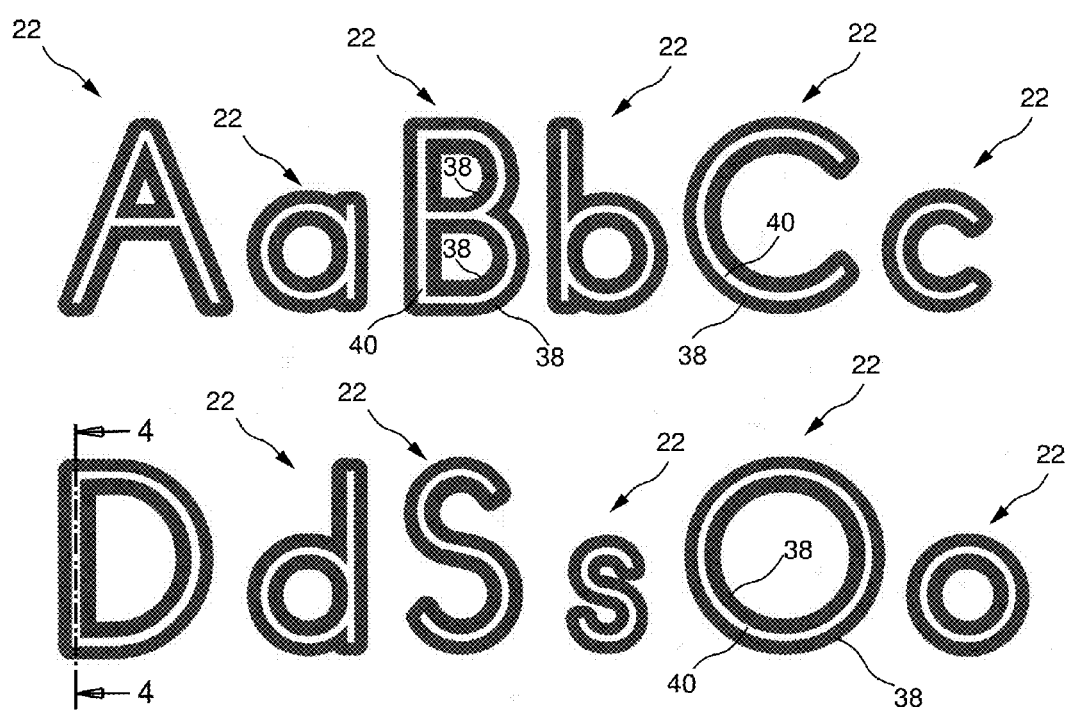
FIG. 1 is a top plan view of pieces of a literacy instruction system.

LIST OF DRAWING REFERENCE NUMERALS 22 piece
30 body
32 top face
34 bottom face
36 external edge
38 raised outline
40 groove
42 groove bottom surface
50 writing surface
60 magnetic material
500 writing instrument
510 tip
600 magnetic board
900 marking

DETAILED DESCRIPTION OF THE INVENTION

Figure 2:
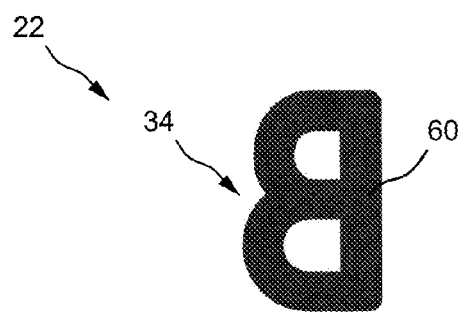
FIG. 2 is a bottom plan view of a piece of the system.
Figure 3:
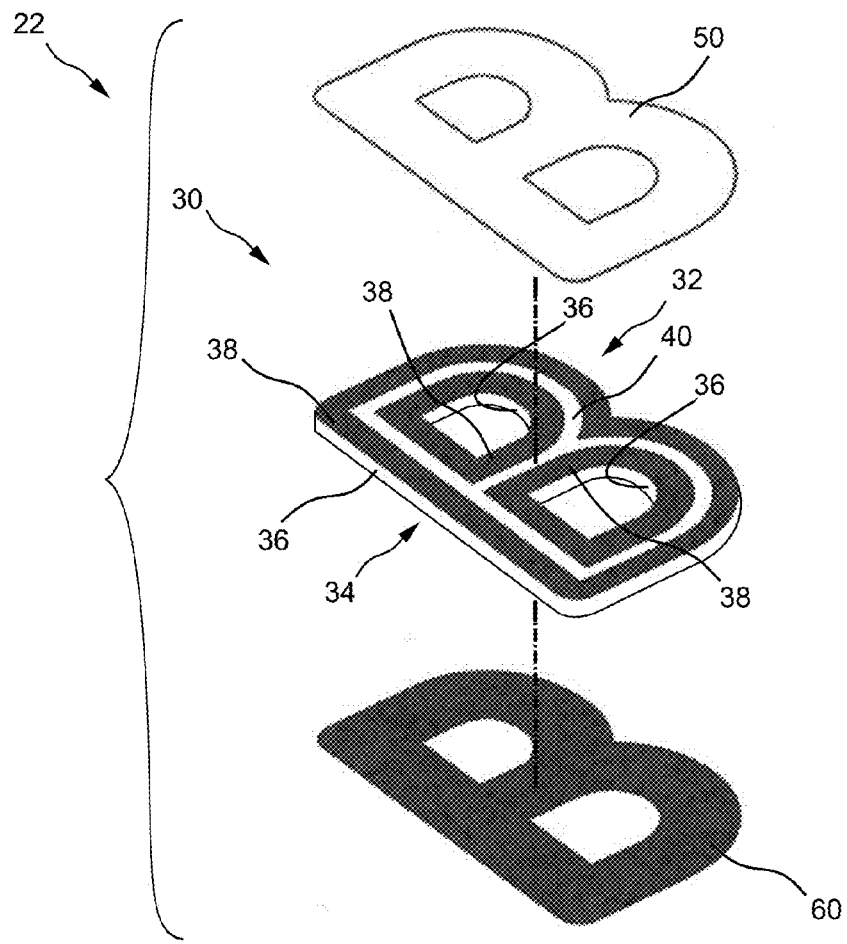
FIG. 3 is an enlarged exploded perspective view of the piece.

Referring initially to FIG. 1, there is illustrated a top plan view of a plurality of pieces 22 of a literacy instruction system. FIGS. 2 and 3 show, respectively, a bottom plan view and an enlarged exploded perspective view of a piece 22 of the system. Each piece 22 has a body 30 having a top face 32, an opposite bottom face 34, and an external edge 36. Top face 32 of each piece has a raised outline 38 which defines a groove 40 therewithin. Each groove 40 is a continuous path in the shape of a character used in writing, such as a letter, numeral, geometric shape, punctuation mark, or symbol.

As shown in FIGS. 1 and 3, a single piece 22 may include more than one raised outline 38 as required to define the shape of a character, such as a character which encircles a hole (e.g., 'a', 'o'). For example, the upper case 'C' piece has one raised outline 38, the upper case 'O' piece has two raised outlines 38 (encircling one hole), and the upper case 'B' piece has three raised outlines 38 (encircling two holes). Each of these pieces has only one groove 40 in the shape of the piece character as it is written. In the case where a letter as written does not consist of a continuous path (such as 'i' or 'j'), piece 22 includes more than one groove 40 to form the shape of the character as it is written.

External edge 36 of each piece forms the shape of the same character defined by raised outline 38. A single piece 22 may include more than one external edge 36 to define the shape of a character, in a similar manner as described for raised outline 38. In an embodiment, each raised outline 38 is adjacent to an external edge 36, meaning that they share a common border. External edge 36 being shaped like a character is beneficial to provides tactile reinforcement as the student can feel the shape of the character, in addition to seeing it and tracing it. This multisensory aspect of the pieces speeds the learning process and improves retention of what is being taught.

A flexible, erasable writing surface 50 is adhered to raised outline 38 so that it completely covers groove 40. Writing surface 50 is made, for example, of polyethylene, cellophane, or other plastic sheet. In an embodiment, writing surface 50 is transparent. In another embodiment, writing surface 50 is permanently adhered to raised outline 38, for example as a laminate. Raised outline 38 may for example be formed using 0.022" or thicker raised chipboard, hard plastic, wood, or metal material.

In an embodiment, bottom face 34 of each piece 22 is covered in a magnetic material 60 which enables piece 22 to adhere to any magnetic surface. For example, a 0.02" or 0.03" thick flexible magnetic sheet may be permanently adhered to bottom face 34.

Figure 4:
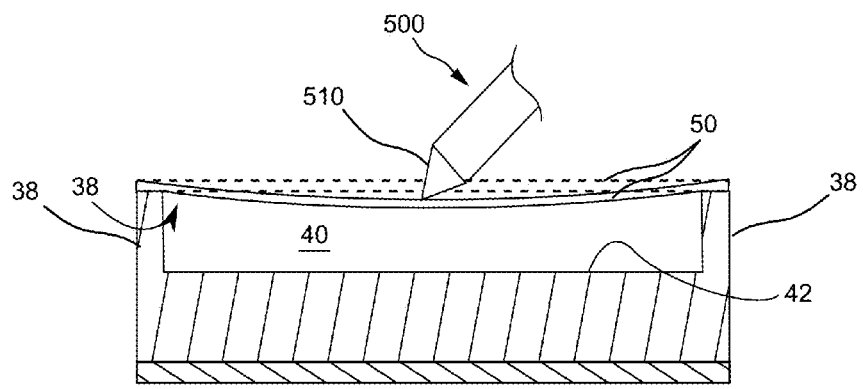
FIG. 4 is a rotated enlarged cross-sectional view along the line 4-4 of FIG. 1.

FIG. 4 is a rotated enlarged cross-sectional view along the line 4-4 of FIG. 1, in which material thicknesses are exaggerated for clarity. Writing surface 50 is configured to receive the tip 510 of a writing instrument 500 and resiliently depress into the character shaped groove 40, whereby raised outlines 38 guide tip 510 to aid in writing the character. Writing surface 50 is shown in alternate positions where solid lines indicate writing surface 50 resiliently depressing into groove 40, and dashed lines indicate the position prior to and after use (when tip 510 is not applied). Depression of surface 50 is caused by pressure applied by tip 510, when the student traces the character. Sectional cross-hatching is excluded from the drawing of writing surface 50 for clarity.

Figure 5:
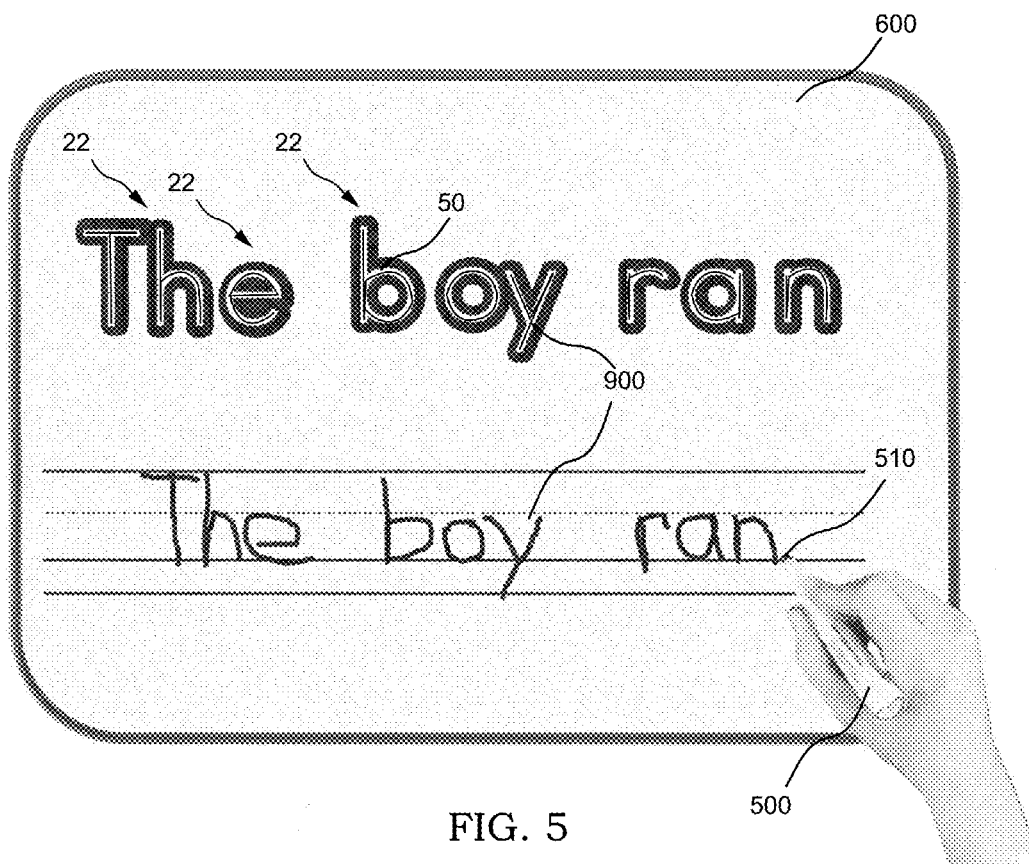
FIG. 5 shows the system in use.

FIG. 5 shows the system in use, wherein a student is instructed to use writing instrument 500 to write a character on the writing surface 50 of a piece 22. Multiple pieces 22 are arranged on a magnetic board 600, preferably having an erasable surface. Pieces 22 in the shape of letters may be manipulated by a student or instructor to aid in the process of learning to read and spell, as illustrated by the short sentence shown in FIG. 5.

As shown in FIG. 5, multiple character pieces are arranged to form a word or sentence and are held in position by their magnetic backing. Markings 900 made on each letter are plainly visible with all pieces comprising the word or sentence still in position; that is, the markings made by the student are not obscured by any of the pieces 22. This feature is critical when using the system to teach reading, and would not be possible with conventional stencils where the frame used for tracing one letter would partially block other written letters. The student is further instructed to duplicate the sentence below pieces 22, using pieces 22 and markings 900 in grooves 40 as a visual guide.

Writing instrument 500 is used to make impermanent markings 900 on the writing surfaces 50 of pieces 22. Writing instrument 500 is preferably an impermanent writing instrument, meaning an instrument which leaves an impermanent mark such as a dry-erase marker or crayon. In this manner, piece 22 may be written on and then wiped clean.

In an embodiment, the system includes at least one piece having the shape of each letter of the alphabet corresponding to the language for which the system is designed. For example, an English language set would include either 26 pieces with one for each upper case letter, 26 pieces with one for each lower case letter, or 52 pieces with all upper and lower case letters.

Figure 6:
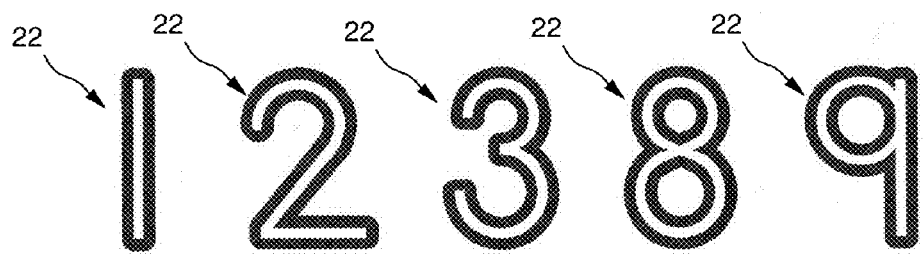
FIG. 6 is a top plan view of pieces of the system having the shape of numerals.

In another embodiment, the system includes pieces 22 having the shape of every single-digit Arabic numeral. An example of several such pieces is shown in FIG. 6. For an English language set the system would include 10 numerals, 0-9.

Figure 7:
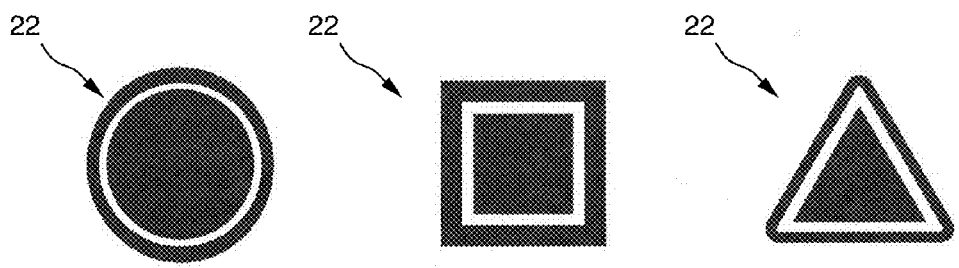
FIG. 7 is a top plan view of pieces of the system having geometric shapes.

In an embodiment, the system includes a plurality of pieces 22 having geometric shapes, such as those shown in FIG. 7.

Figure 8:
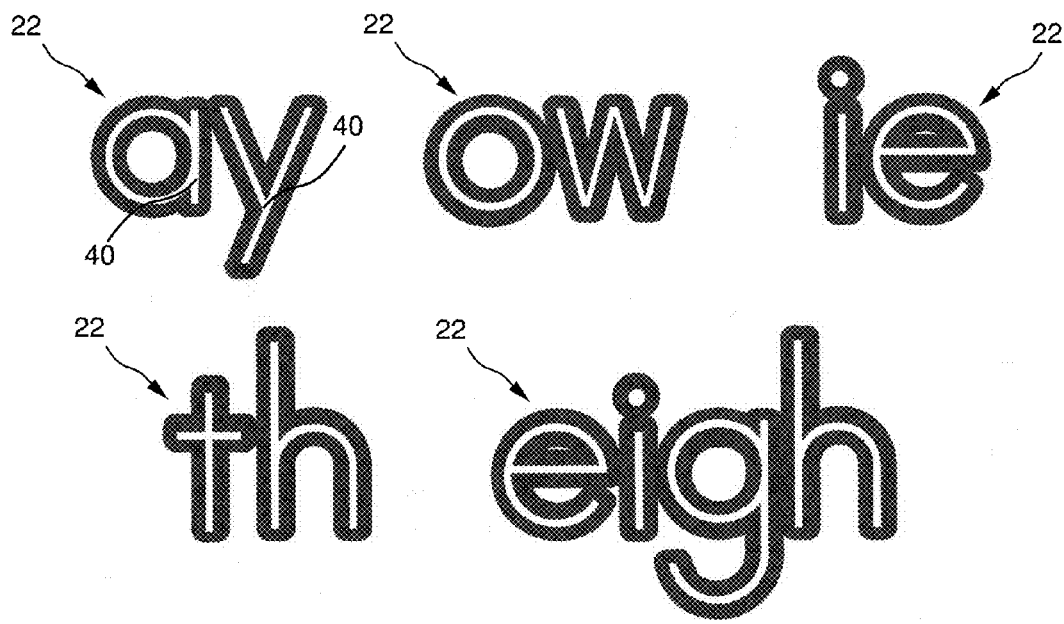
FIG. 8 is a top plan view of pieces of the system having multiple letter combinations.

In an embodiment, the system includes a plurality of pieces 22 having multiple grooves 40, each in the shape of a letter, which are used to represent digraphs. Digraph as used herein means a combination of two or more letters which represent a single pronounced sound, or phoneme. Examples of pieces 22 which represent digraphs are shown in FIG. 8, and include 'ay', 'ow', 'ie', 'th', and 'eigh'. Other common English language digraphs include 'ou', 'wh', 'wr', 'igh', 'ck', 'er', 'ir', 'ur', 'sh', 'ch', 'th', and others. The digraph pieces assist a student in learning to pronounce these letter combinations as only one sound, as opposed to one sound per letter.

In an embodiment of the system for English learners, included pieces are 52 letter pieces representing 26 upper and 26 lower case letters, 10 numeral pieces 0-9, and a plurality of common digraphs of the English language.

Figure 9A:
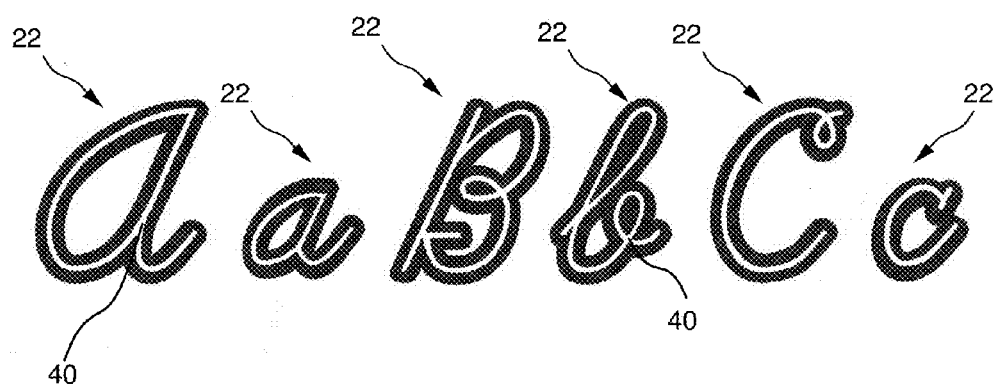
FIGS. 9A-9B are top plan views of pieces of the system in different styles.
Figure 9B:
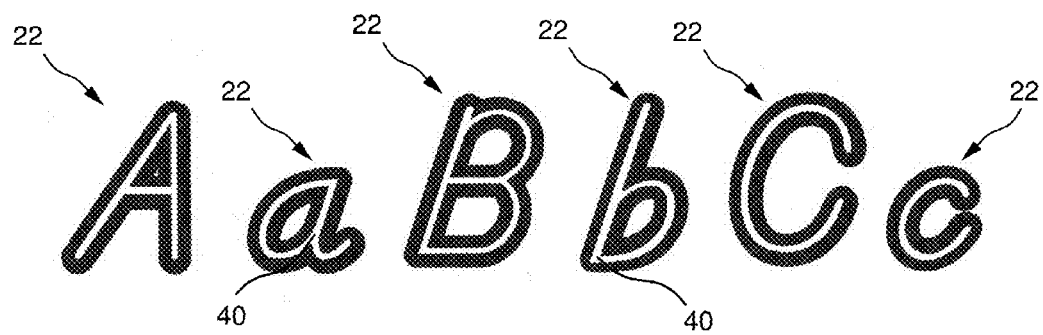

In another embodiment, pieces 22 in the shape of letters are in the cursive style, as shown in FIG. 9A. Grooves 40 in these cursive style pieces are shaped to allow a student to form a cursive letter with one continuous, natural movement. In another embodiment, pieces 22 in the shape of letters are in the D'Nealian style, as shown in FIG. 9B.

In an embodiment, each groove 40 has a groove bottom surface 42, meaning the surface which defines the bottom of the groove (see FIG. 4). Groove bottom surface 42 and raised outline 38 of each piece preferably have contrasting colors, to enhance the visual perception of the groove. For example, raised outline 38 is blue while the groove bottom surface 42 is white. To provide further visual cues, the consonants, vowels, and digraphs of the same set have differently colored raised outlines 38, for example blue consonants, red vowels, and purple digraphs.

In another embodiment of the system, a plurality of pieces 22 are packaged with a magnetic board 600, an impermanent writing instrument 500, an eraser, and instructional materials.

In another embodiment of the system, a plurality of pieces 22 are packaged with a board having recesses complementary to the shapes of pieces 22 into which pieces 22 fit like a puzzle.

The embodiments of the multisensory literacy system described herein are exemplary and numerous modifications, combinations, variations, and rearrangements can be readily envisioned to achieve an equivalent result, all of which are intended to be embraced within the scope of the appended claims. Further, nothing in the above-provided discussions of the system and method of use should be construed as limiting the invention to a particular embodiment or combination of embodiments. The scope of the invention is defined by the appended claims.

I claim:

1. A literacy instruction system cooperating with a writing instrument having a tip, the system comprising:
    a plurality of pieces each having a body having a top face, an opposite bottom face, and an external edge;
    a raised outline extending outward from the top face and defining a groove therewithin, the groove having a groove bottom surface, wherein the raised outline is adjacent to the external edge;
    and, a flexible, erasable writing surface permanently adhered to the raised outline, covering the groove without contacting the groove bottom surface, and sized so as not to extend beyond the external edge;
    each groove being a continuous path in the shape of a character;
    the external edge of each piece forming the shape of at least one character; and,
    each writing surface configured to receive the tip of the writing instrument and resiliently depress into the groove below, whereby the raised outline guides the tip to aid in writing the character for which the groove is shaped.

2. The system according to claim 1, wherein the writing surface is transparent.

3. The system according to claim 1, wherein the bottom face of each piece is covered in a magnetic material.

4. The system according to claim 1, wherein the plurality of pieces includes pieces each having the shape of a letter of an alphabet, wherein all letters of the alphabet are represented.

5. The system according to claim 4, wherein the pieces having the shape of a letter of the alphabet are in a cursive style.

6. The system according to claim 4, wherein the pieces having the shape of a letter of the alphabet are in a D'Nealian style.

7. The system according to claim 1, wherein the plurality of pieces includes pieces each having the shape of a single-digit Arabic numeral, wherein all single-digit Arabic numerals are represented.

8. The system according to claim 1, wherein the plurality of pieces includes pieces each having a geometric shape.

9. The system according to claim 1,
    wherein the plurality of pieces includes pieces each representing a digraph, having more than one groove in the shape of a letter, and wherein the shape of the external edge is limited to the shape of multiple adjacent letters.

10. The system according to claim 1,
    wherein the groove bottom surface and the raised outline of each piece have contrasting colors.

11. The system according to claim 1, further including:
    the writing surface being transparent;
    the bottom face of each piece being covered in a magnetic material;
    the plurality of pieces including pieces each having the shape of a letter of an alphabet, wherein all letters of the alphabet are represented, and pieces each having the shape of a single-digit Arabic numeral, wherein all single-digit Arabic numerals are represented;
    the plurality of pieces including pieces each representing a digraph, having more than one groove in the shape of a letter, and wherein the shape of the external edge is limited to the shape of multiple adjacent letters; and,
    wherein the groove bottom surface and the raised outline of each piece have contrasting colors.

\* \* \* \* \*